United States Patent [19]

Williams et al.

[11] 3,998,681
[45] Dec. 21, 1976

[54] METHOD OF MAKING A HICKEY ROLLER

[75] Inventors: Leland E. Williams, Centerville, Ohio; Glen B. Meredith, Three Rivers; James R. Ungurait, Portage, both of Mich.; Thomas C. Rhodarmer, Canton, N.C.

[73] Assignee: Dayco Corporation, Dayton, Ohio

[22] Filed: July 7, 1975

[21] Appl. No.: 593,902

Related U.S. Application Data

[62] Division of Ser. No. 419,848, Nov. 28, 1973, abandoned.

[52] U.S. Cl. .............................. 156/154; 15/159 A; 29/120; 51/281 R; 51/289 R; 156/185; 156/243; 156/244; 264/108; 264/162; 264/236; 264/255; 300/21; 427/278; 427/358; 427/377; 427/385 R

[51] Int. Cl.² .................... B32B 25/02; B29H 9/11; B32B 5/08

[58] Field of Search ............... 29/120, 132; 300/21; 15/159 A, 230.13, 230.16, DIG. 3; 51/289 R, 281 R; 428/88–91, 151; 156/154, 155, 243, 244, 185, 187, 194, 193, 215, 196; 264/108, 138, 139, 162, 236, 250, 255, 259; 427/277, 278, 358, 375, 377, 385 R

[56] References Cited

UNITED STATES PATENTS

| 2,119,491 | 5/1938 | Rapport | 29/120 |
|---|---|---|---|
| 2,234,779 | 3/1941 | Rose | 29/120 X |
| 2,569,546 | 10/1951 | Treue | 29/132 X |
| 3,211,598 | 10/1965 | O'Brien, Jr. | 156/244 X |
| 3,411,931 | 11/1968 | Burns et al. | 29/120 X |
| 3,460,222 | 8/1969 | Mitchell, Jr. | 29/132 X |
| 3,607,494 | 9/1971 | Rowland | 156/244 X |
| 3,617,426 | 11/1971 | Grundman | 428/90 X |
| 3,635,158 | 1/1972 | Budinger | 29/132 X |
| 3,808,657 | 5/1974 | Menges et al. | 29/120 |
| 3,888,718 | 6/1975 | Arnaudin, Jr. et al. | 156/244 X |

*Primary Examiner*—Charles E. Van Horn
*Assistant Examiner*—Thomas Bokan
*Attorney, Agent, or Firm*—Reuben Wolk

[57] ABSTRACT

An improved hickey roller and method of making same is provided wherein such roller has a longitudinal axis and comprises an outer portion made of an elastomeric matrix having a substantially cylindrical outside surface and a plurality of elongated fibers having inner portions embedded in the matrix and outer portions extending outwardly from the cylindrical surface to define a brushlike construction. The elongated fibers are arranged approximately parallel to the longitudinal axis and the fibers have a denier ranging between 4 and 8 and each fiber has a cohesive strength which is greater than the cohesive strength of the matrix and greater than the adhesive force holding each fiber in the matrix.

10 Claims, 7 Drawing Figures

METHOD OF MAKING A HICKEY ROLLER

This is a division of application Ser. No. 419,848, filed Nov. 28, 1973 and now abandoned.

BACKGROUND OF THE INVENTION

Offset printing is a printing technique which has been used for many years; and, in the course of printing, foreign particles of dried ink, paper, dirt, and the like, cause inked spots on the finished copy. These foreign particles are popularly referred to by printers and others in the printing industry as "hickeys", and various techniques have been proposed for removal of these hickeys from printing plates, including the use of rollers referred to as "hickey rollers".

The "hickey rollers" proposed heretofore are considered as being generally deficient. For example, some of such previously proposed hickey rollers tend to absorb excessive amounts of ink while being operated to remove hickeys causing defective printing, others of such previously proposed rollers must be removed from their associated press for cleaning, and still others require special (and usually expensive) maintenance to keep them operative.

SUMMARY

This invention provides a simple yet improved hickey roller and a comparatively inexpensive method of making the same wherein such roller overcomes many of the deficiencies of previously proposed rollers. In particular, the hickey roller of this invention has a central longitudinal axis and comprises an outer portion made of an elastomeric matrix having a substantially cylindrical outside surface and a plurality of elongated fibers having inner portions embedded in the matrix and outer portions extending outwardly from the cylindrical surface to define a brush-like construction. The elongated fibers are arranged approximately parallel to the longitudinal axis and the fibers have a denier ranging between 4 and 8 and each fiber has a cohesive strength which is greater than the cohesive strength of the matrix and greater than the adhesive force holding each fiber embedded in the matrix.

Other details, uses, and advantages of this invention will be readily apparent from the exemplary embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 1:
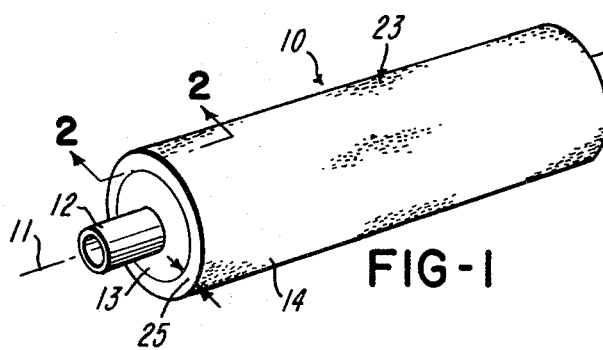
FIG. 1 is a perspective view illustrating one exemplary embodiment of the hickey roller of this invention.
Figure 2:
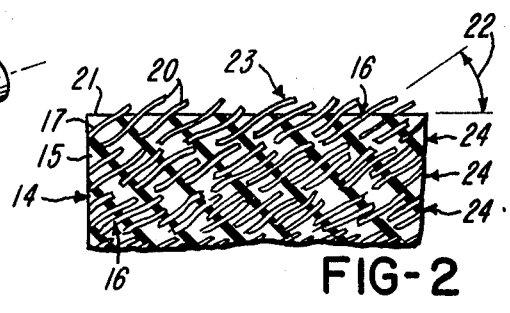
FIG. 2 is an enlarged fragmentary cross-sectional view taken essentially on the line 2—2 of FIG. 1.

Reference is now made to FIG. 1 of the drawings which illustrates an exemplary hickey roller of this invention which is designated generally by the reference numeral 10 and such roller has a longitudinal axis 11 and is comprised of a central supporting shaft 12 which carries a cylindrical support 13 and an outer tubular or cylindrical portion designated generally by the reference numeral 14 and defined, also see FIG. 2, by an elastomeric matrix material 15 having a plurality of elongated fibers 16 embedded therein. The hickey roller 10 is particularly adapted to be rotatably supported on suitable supports, not shown, and used in a printing system of known construction in accordance with techniques which are well known in the art so that it may perform its function of removing hickeys from printing plates, and the like, in a substantially maintenance-free manner without requiring removal of such hickey roller from the printing press for routine maintenance.

As seen particularly in FIG. 2, the elongated fibers 16 may have different lengths within a predetermined range as will be described later and have inner portions 17 which may be embedded in the elastomeric matrix 15 different lengths or amounts and have other portions 20 which extend outwardly different lengths or amounts from a substantially right circular cylindrical outside surface 21 of the outer portion 14 of the roller 10 to define what may be considered a brush-like structure or construction. The elongated fibers 16 are arranged approximately parallel to the longitudinal axis 11; however, due to the manner in which such fibers are embedded in their matrix prior to curing thereof the fibers 16 may be arranged at various angles. In general, each fiber 16 is arranged so that it is embedded in the elastomeric matrix 15 and its outer portion 20 extends outwardly from the cylindrical surface 21 at an angle of roughly 45° or less, as indicated at 22.

As previously mentioned and as will be apparent from FIG. 2, the fibers 16 have different lengths and it has been found by tests that best results are obtained when the fibers range in length between 5 and 10 millimeters. In addition, the fibers 16 have a precisely controlled fineness and preferably such fibers have a denier range between 4 and 8.

Each of the fibers 16 also has a cohesive strength which is greater than the cohesive strength of the matrix material 15 and each fiber 16 has a cohesive strength which is greater than the adhesive force holding each fiber in the matrix whereby these properties enable the hickey roller 10 to be made using the method of this invention and such roller will have a brush-like outer construction as illustrated in an exaggerated manner at 23 in FIG. 2. The brush-like construction as illustrated at 23 is such that it provides optimum removal of hickeys from components of a printing press in the required manner, yet does not absorb ink to excess. This latter property of minimum ink absorption is further assured by providing the fibers 16 so that they have the physical properties described above.

Any suitable material may be used to make the elastomeric matrix 15; however, such matrix is preferably made of a slightly compressible yet resilient elastomeric material; and, in one application of this invention the elastomeric material used was a nitrile rubber compound having a hardness generally of the order of 30 as measured on the commonly used Shore durometer using the A scale of such durometer.

The exemplary hickey roller 10 may be made so that the fibers 16 are arranged therein in a plurality of radially spaced layers as indicated at 24 in FIG. 2, for example. The layers illustrated at 24 do not exist as distinct separate layers having defined junction lines between adjoining pairs of layers due to the method in which the roller of this invention is defined. Nevertheless, the fibers 16 are in fact arranged in roughly concentric radially spaced layers defined in the outer portion 14 of the roller and the number of layers in such outer portion is determined by the thickness of each layer and the total thickness of the outer portion. In this example the outer portion 14 has a thickness indicated at 25 which is a fractional part of the thickness of the roller as measured along a radius from its longitudinal axis 11. In one application of this invention the outer portion of the roller 10 had a thickness as indicated at 25 of roughly ¼ inch with the radius of the roller being approximately 1½ inches.

Having described the exemplary hickey roller 10, the detailed description will now proceed with unique steps of this invention which may be utilized to make such roller. In particular, an elastomeric material may be provided in sheet form, shown as an exemplary sheet 27 in FIG. 3, and the sheet 27 is comprised of an uncured nitrile rubber compound or matrix 15 having fibers 16 embedded therein and arranged in roughly parallel relation. The matrix and fibers are designated by the reference numerals 15 and 16 respectively even though the sheet 27 is yet uncured so that the component parts of the completed roller 10 may be easily correlated with the components utilized in the method steps to make such roller.

The sheet 27 is supported on a cylindrical support 13 by spirally winding or coiling a desired predetermined amount of such sheet thereon to define an outer portion which will be designated by the reference numeral 14 as in the completed roller 10. The winding or coiling is achieved so that the fibers 16 are arranged roughly parallel to the axis 11 and for reasons which will be explained subsequently.

The sheet 27 may be of any desired thickness 30. However, such thickness is preferably of the order of 0.060 – 0.070 inch and a sufficient number of coils is provided on the cylindrical support 13 to define the desired thickness for the outer portion 14.

The uncured sheet 27 may be of a predetermined length so that the entire sheet may be wound on the cylindrical support 13 to define the desired thickness for the outer portion 14 of the roller 10. It will also be appreciated that the uncured sheet 27 may be comparatively long and provided as a supply roll thereof (not shown). The sheet 27 may be suitably unwound from such supply roll and once the desired number of turns are provided on the support 13 the sheet may be cut away from its supply roll by cutting parallel to the longitudinal axis 11 using any suitable cutting device.

As previously mentioned, the elongated fibers 16 are arranged in roughly parallel relation and these fibers are dispersed and aligned in the sheet 27, whether such sheet 27 is of predetermined length or of substantial length and provided as a supply roll, using any technique which is known in the art.

Figure 3:
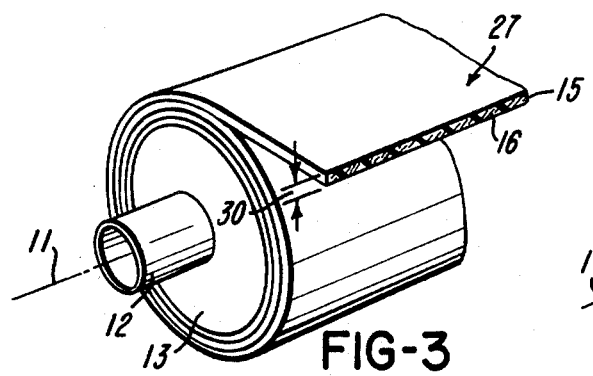
FIG. 3 is a perspective view with parts in cross section and parts broken away particularly illustrating a method step wherein a sheet of elastomeric material having roughly parallel fibers embedded therein is wrapped spirally around a cylindrical support.
Figure 4:
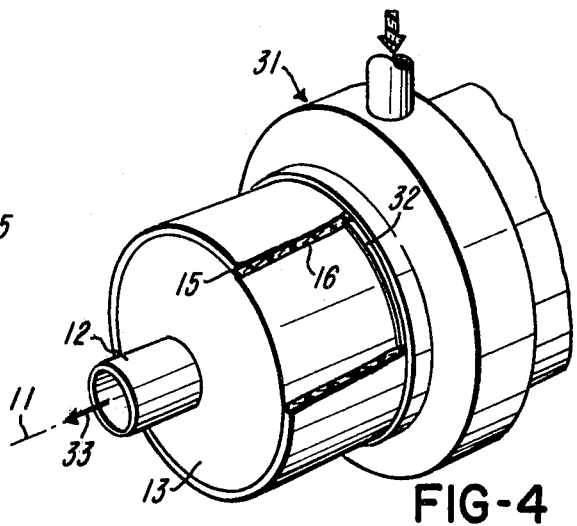
FIG. 4 is a perspective view with parts in cross section and parts broken away particularly illustrating a typical method step which may be an alternative to the step of FIG. 3 wherein an elastomeric material having elongated fibers embedded therein is provided around a cylindrical support by extrusion through an extrusion die.

The step of providing an elastomeric material on a cylindrical support 13 need not be accomplished as shown and described in connection with FIG. 3 but may be alternately provided on the elongated support 13 which is carried by shaft 12 by an extrusion process as illustrated in FIG. 4. For example, an extrusion apparatus 31 may be provided through which uncured elastomeric matrix material 15 having elongated fibers 16 randomly dispersed or mixed therein is extruded through a circular orifice 32 provided in the stationary apparatus 31 while moving the shaft 12 and cylindrical support 13 therethrough essentially as illustrated by the arrow 33.

The orifice 32 is of comparatively small radial thickness and a layer of elastomeric material 15 is extruded through orifice 32 as a tubular layer and deposited as a sleeve on cylindrical support 13. Simultaneously with the depositing of such layer the fibers 16 are substantially aligned as they pass through the orifice 32 and are arranged approximately parallel to the axis 11 of the support 13.

The extruded layer may have any desired thickness and a single layer may have a thickness of the order of 0.060–0.070 inch. To provide the desired final thickness for the outer portion 14 of a roller the cylindrical support 13 may be passed through a series of circular orifices 32 of increasing size and successive tubular layers or sleeves plied essentially around and on top of each other until the desired number of layers are accumulated on the cylindrical support 13 to provide the desired thickness of elastomeric material and embedded fibers which defines the outer portion 14 of roller 10.

Figure 5:
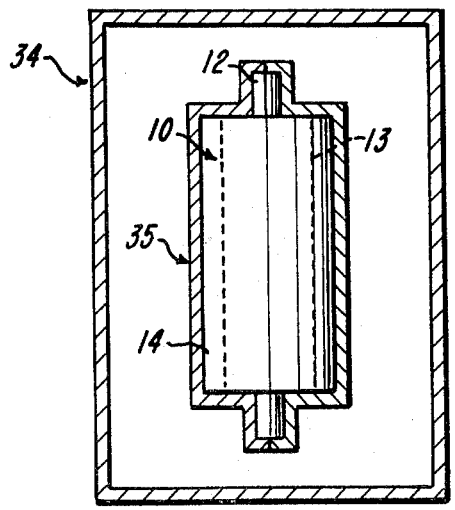
FIG. 5 is a schematic view illustrating the step of curing the fiber-embedded elastomeric material provided on a cylindrical support either by the step illustrated in FIG. 3 or FIG. 4 with the curing being achieved in a moisture-free environment.

The roller with its outer portion 14 uncured is then placed in a curing apparatus which is shown schematically in FIG. 5. and designated generally by the reference numeral 34 so that the outer portion 14 is cured in a moisture-free environment, and this moisture-free cure is achieved by providing a fluid-tight jacket 35 around the roller in accordance with techniques which are well known in the art. The apparatus 34 provides a controlled temperature environment around the jacket 35 compatible with the elastomeric matrix 15 and using known apparatus and methods whereby the outer portion 14 is cured in the absence of water or moisture.

Figure 6:
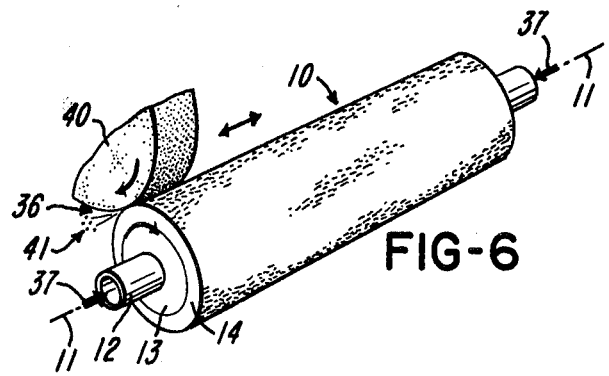
FIG. 6 is a perspective view with parts broken away particularly illustrating the step of machining the outer portion of the cured elastomeric matrix having the fibers embedded therein with the machining being achieved in this illustration by a grinding device.

After curing, the outer portion 14 is machined as illustrated at 36 in FIG. 6. This machining action may be provided by suitably supporting the roller 10 on centers designated by the reference numeral 37 and rotating such roller while simultaneously machining the outside surface of the roller to define the cylindrical outside surface 21 thereof. The machining action in this example is achieved by a grinding apparatus in the form of a grinding wheel 40.

Each fiber has a cohesive strength which is greater than the cohesive strength of the matrix material whereby the matrix 15 may be machined or ground away as shown at 41 while the fibers 16 remain substantially intact and undamaged. As the matrix 15 is ground to remove elastomeric matrix material 15 outer portions 20 of the fibers 16 are exposed and such outer portions are arranged radially outwardly of the cylindrical surface 21 defined by the grinding action of wheel 40. The fibers 16 are held in their matrix 15 by their radially inwardly arranged portions 17. With this action it will be seen that the outer portions 20 extend outwardly from the cylindrical surface 21 and define the brush-like construction shown at 23 for the hickey roller 10.

The matrix material 15 is provided on the cylindrical support 13 so that it defines the outer portion 14 having elongated fibers 16 which extend in approximately parallel relation and approximately parallel to the longitudinal axis 11, as previously mentioned. During the machining or grinding action and because of the parallel arrangement of the fibers 16, the machining instrument such as the grinding wheel 40 engages large surface increments of the fibers 16 as the roller is supported and rotated on centers 37 whereby the exposed outer portions of such fibers are moved or arranged approximately transverse the longitudinal axis 11 rather than being sheared or ground away. Once the grinding wheel 40 is removed the outer portions 20 of the fibers return essentially to the positions they occupied prior to grinding to define the brush-like outer portion for the hickey roller 10.

The fibers are engaged and temporarily deflected transverse the axis 11 rather than being sheared due in large measure to their having a cohesive strength which is greater than the cohesive strength of the elastomeric matrix 15 being ground away by the grinding wheel 40. It has been found through tests that if the fibers 16 were to be arranged so that they extended approximately radially, i.e., their elongated dimension extending radially, upon grinding the tendency was to continually grind away each exposed outer increment as the grinding wheel progressed into the elastomeric matrix rather than bend away the fibers while keeping them substantially intact and undamaged.

During the grinding action, the right circular cylindrical surface 21 is defined and the smoothness of such surface is controlled by the degree of fineness of the grinding wheel. Basically, the surface 21 is a right circular cylindrical surface having minute random pits or valleys therein as defined by the character of the grinding wheel. It will be appreciated that in those instances where a comparatively coarse wheel is utilized, that the fibers 16 tend to nest partially within valleys or minute pits in the surface of the wheel which helps prevent their being sheared or ground and helps assure they are merely temporarily turned transverse the longitudinal axis 11.

As previously mentioned, the outer portion 14 of the hickey roller 10 is defined by a plurality of approximately concentric tubular layers of material whereby the elastomeric fibers 16 are also in a corresponding plurality of radially spaced layers. Regardless of the manner in which the outer portion is defined, i.e., the technique of FIG. 3 or the technique of FIG. 4, once the uncured outer portion 14 is cured in an apparatus such as the apparatus 34 such outer portion is defined completely free of fusion lines between layers of matrix 15 and the matrix is in essence a single fusion free unitary matrix structure.

It will also be appreciated that due to the unique and concentric arrangement of fibers 16 in a plurality of tubular layers it is entirely within the scope of this invention to define an initial hickey roller 10 as presented herein and use such roller until its brush-like outer portion 23 is either worn away or rendered substantially ineffective; and, when this occurs the ineffective outer portion may be ground away essentially as illustrated and described in connection with FIG. 6 to define a new brush-like outer portion.

Figure 7:
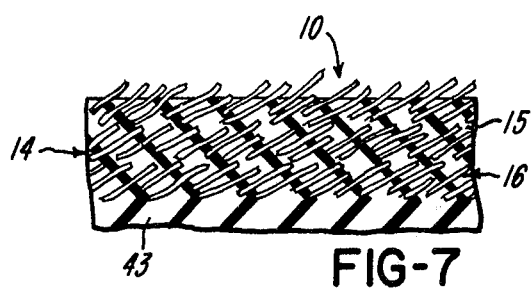
FIG. 7 is a fragmentary cross-sectional view illustrating another exemplary embodiment of a hickey roller of this invention.

The roller 10 has been described as having its outer portion 14 defined by a plurality of roughly concentric roughly radially spaced layers with each layer having parallel fibers 16 embedded therein. The outer portion 14 is supported on portion 13 which is preferably made of a comparatively rigid material, such as hard plastic, metal, or the like. However, it will be appreciated that the outer portion 14 may be defined as a single layer or a plurality of layers having fibers 16 embedded therein as shown in FIG. 7 with portion 14 being supported concentrically around a compressible resilient elastomeric portion 43 which is free of fibers 16 or the like. The portion 14 is in turn supported on the cylindrical support 13.

The fibers 16 may be made of any suitable material provided that the physical properties of such material are essentially as described previously. In one application of this invention nylon fibers 16 were used and provided exceptional results when embedded in a matrix 15 made of nitrile rubber.

Although a rubber compound such as nitrile rubber is preferably employed to define the matrix 15, it is to be understood that any suitable elastomeric material may be used to define such matrix.

While present exemplary embodiments of this invention, and methods of practicing the same, have been illustrated and described, it will be recognized that this invention may be otherwise variously embodied and practiced within the scope of the following claims.

What is claimed is:

1. A method of making a hickey roller comprising the steps of, providing an elastomeric matrix material having elongated substantially parallel fibers therein, supporting said elastomeric matrix material on a cylindrical support to define a roller having a longitudinal axis and having an outer tubular portion, said supporting step also serving to arrange said fibers approximately parallel to said longitudinal axis, curing said outer portion in a moisture-free environment to define a cured elastomeric matrix having said fibers embedded therein with each fiber having a cohesive strength which is greater than the cohesive strength of said elastomeric matrix and each of said fibers also having a cohesive strength which is greater than the adhesive force holding each fiber in said elastomeric matrix, and machining said outer portion to remove elastomeric matrix from and thereby expose portions of said fibers which are arranged radially outwardly of a cylindrical surface defined by machining while radially inwardly arranged portions of said fibers are held inwardly of said cylindrical surface by said elastomeric matrix whereby said exposed outer portions of said fibers extend outwardly from said cylindrical surface to define a brush-like construction for said hickey roller, said machining step resulting in comparatively large increments of the exposed outer portions of said fibers being engaged and temporarily moved transverse said longitudinal axis in a non-shearing manner due in large measure to said fibers having said cohesive strength which is greater than the cohesive strength of said elastomeric matrix, said exposed outer portions returning essentially to their original positions following said machining step to define said brush-like construction.

2. A method as set forth in claim 1 in which said providing step comprises providing an uncured sheet of a rubber compound having elongated fibers arranged therein in roughly parallel relation.

3. A method as set forth in claim 2 in which said supporting step comprises the step of wrapping said sheet in a spiral pattern around said cylindrical support with said roughly parallel fibers arranged approximately parallel to said longitudinal axis.

4. A method as set forth in claim 1 in which said step of providing an elastomeric matrix material having said elongated fibers therein comprises providing a nitrile rubber compound having said fibers therein.

5. A method as set forth in claim 4 in which said step of providing an elastomeric matrix material having said elongated fibers therein comprises providing a nitrile rubber compound having nylon fibers embedded therein.

6. A method as set forth in claim 5 in which said providing step comprises providing said nylon fibers having a length ranging between 5 and 10 millimeters and a denier ranging between 4 and 8.

7. A method as set forth in claim 1 in which said supporting step comprises the step of extruding said elastomeric matrix material having said fibers through a circular orifice to define a sleeve of uncured matrix material concentrically around said cylindrical support so that said fibers are arranged approximately parallel to said longitudinal axis.

8. A method as set forth in claim 7 in which said supporting step comprises the further step of extruding said elastomeric matrix material having said fibers through another circular orifice having a large diameter than the diameter of said first-named orifice to define another sleeve of uncured matrix material concentrically around said first-named tubular sleeve so that the fibers are arranged in the outer tubular sleeve approximately parallel to said longitudinal axis.

9. A method as set forth in claim 1 in which said machining step comprises the step of grinding said outer portion with a grinding device.

10. A method as set forth in claim 1 in which said curing step is achieved in a controlled temperature environment while isolating said uncured outer portion in a moisture-impervious jacket.

* * * * *